No. 673,357. Patented Apr. 30, 1901.
W. BROUGH.
AUTOMATIC WEIGHING MACHINE.
(Application filed July 21, 1900.)
(No Model.) 2 Sheets—Sheet 1.
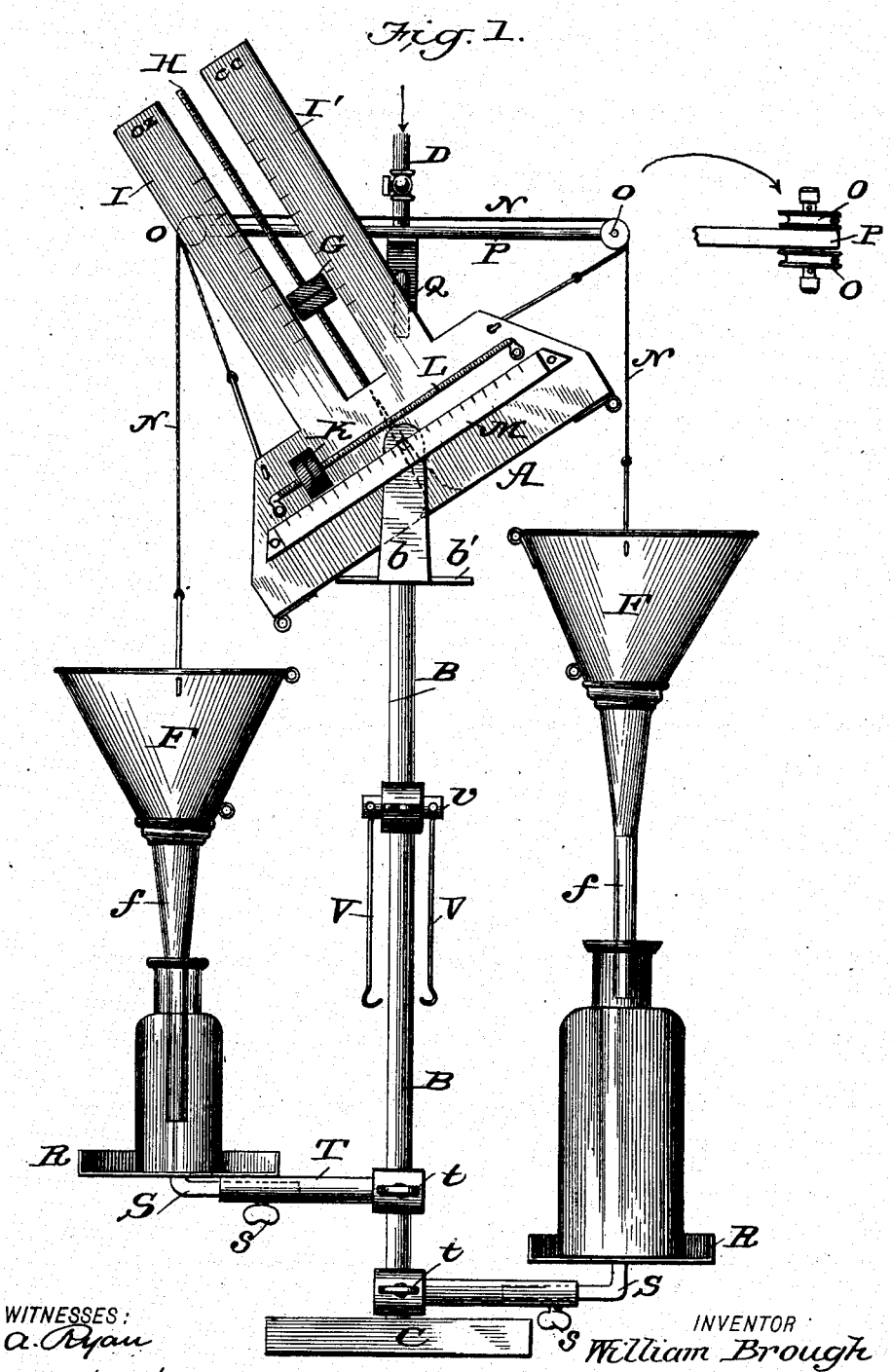

No. 673,357. Patented Apr. 30, 1901.
W. BROUGH.
AUTOMATIC WEIGHING MACHINE.
(Application filed July 21, 1900.)
(No Model.) 2 Sheets—Sheet 2.
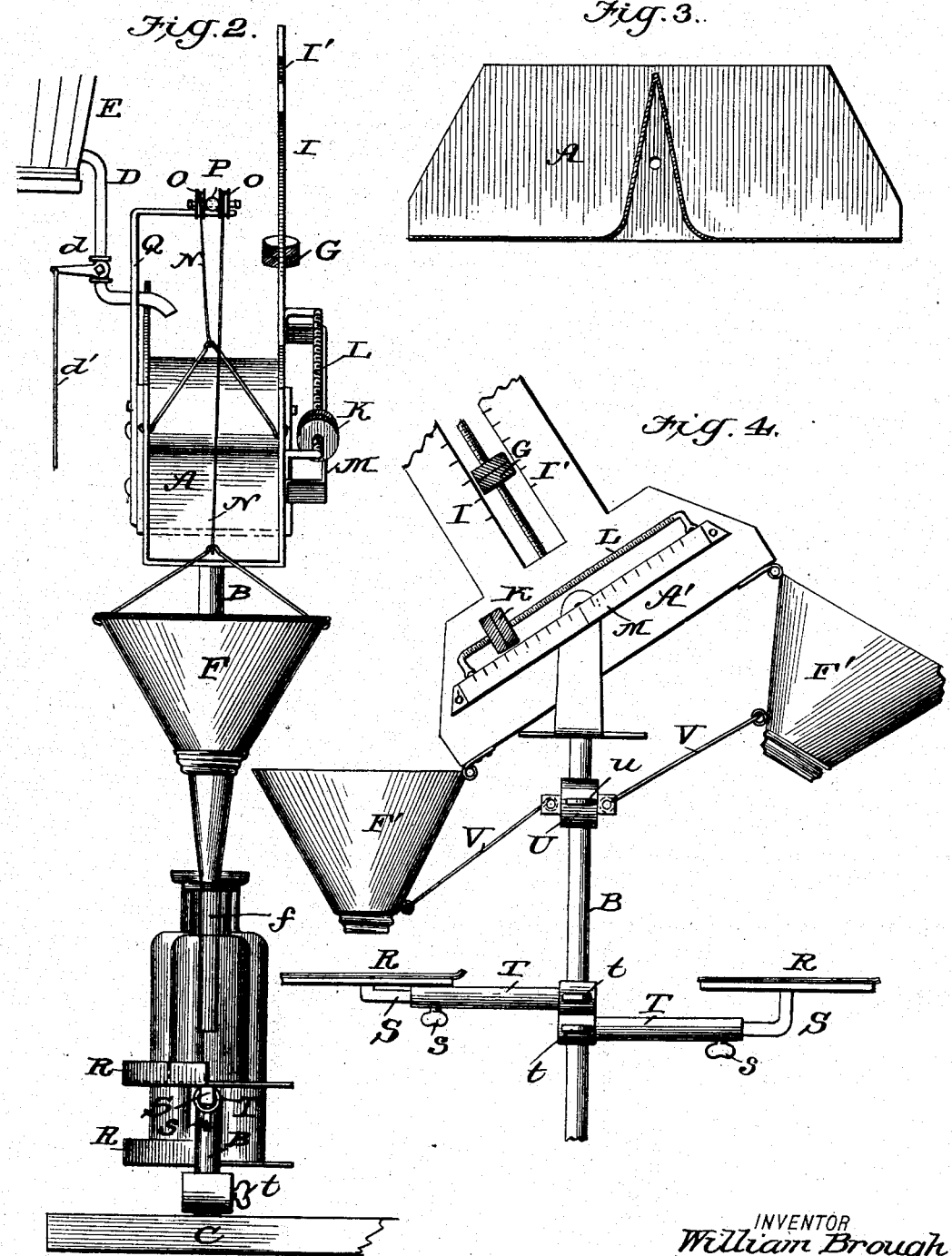
WITNESSES
Jos. A. Ryan
Amos W. Hart
INVENTOR
William Brough.
BY Munn & Co.
ATTORNEYS

UNITED STATES PATENT OFFICE.

WILLIAM BROUGH, OF BALTIMORE, MARYLAND.

AUTOMATIC WEIGHING-MACHINE.

SPECIFICATION forming part of Letters Patent No. 673,357, dated April 30, 1901.

Application filed July 21, 1900. Serial No. 24,400. (No model.)

*To all whom it may concern:*

Be it known that I, WILLIAM BROUGH, residing at Baltimore, in the State of Maryland, have made certain new and useful Improvements in Automatic Weighing-Machines, of which the following is a specification.

It is the object of my invention to provide an improved automatic machine for weighing and measuring liquids and solids and filling bottles and other receptacles therewith.

I employ a tiltable hopper adapted for self-discharge when inclined, and I provide it with weights, which may be shifted to vary the leverage of the hopper on its pivot, and thereby weigh and measure different quantities of a liquid or solid. The hopper discharges into funnels which are suspended from it and provided with removable spouts or nozzles to adapt the machine for weighing different substances.

The details of construction and operation are as hereinafter described.

In the accompanying drawings, (two sheets,) Figure 1 is a side view of my improved machine. Fig. 2 is an end view of the same. Fig. 3 is an enlarged longitudinal section of the tiltable hopper. Fig. 4 is a side view showing an arrangement of parts differing from that shown in Figs. 1 and 2.

The hopper or weighing-pan A has a straight vertical central transverse partition *a* (see Fig. 3) and is therefore provided with two like pockets or compartments, either of which when the hopper is inclined, as shown in Fig. 1, serves for reception of the substance to be weighed. It is pivoted in the middle of its length between vertical forks *b* of a standard B, having a suitable flat base C. The substance to be weighed is discharged into the hopper from a pipe D, leading from a tank E.

It will be noted the partition *a* is double and its sides separated by a considerable space, the partition gradually widening from the thin top edge downward, as shown. By this construction the sensitiveness of the hopper to leverage or in respect to tilting and thereby weighing substances is increased, since the said substances are caused to strike and rest upon the floor of the hopper at a point farther from the pivot than would be the case if the partition were thin or narrow.

The lower angles of the hopper A are also rounded or curved, as shown in Fig. 3, to prevent lodgment of powdered substances at those points and to facilitate discharge of the same.

As shown in Fig. 1, when the hopper A is tilted it strikes upon and is thus arrested by the cap or top plate *b'* of standard B. When thus inclined, the substance delivered from the pipe D enters the compartment or pocket that is elevated, and when the weight of said substance reaches a predetermined limit the hopper tilts to the oppositely-inclined position, and thus discharges the substance into a funnel F, by which it is conveyed into a bottle or other receptacle. This tilting movement brings the other compartment or pocket uppermost, and it in turn receives the substance to be weighed, which, when a sufficient quantity has accumulated, tilts the hopper again and is discharged into the other bottle or receptacle. Thus the hopper is filled and tilts automatically so long as the discharge from pipe D continues. This discharge may be arrested by a cock or valve *d*, from whose lever-arm a cord or rod *d'* depends. In practice I propose to connect such cord with a foot-lever or treadle, (not shown,) by which means the discharge may be instantly cut off when desired.

The leverage and weighing capacity of the hopper are determined by the following means: If equal quantities and weights of a liquid or solid are to be received by the two hopper-compartments, I use the weights G, which are nuts working on the threaded rod H, that rises from the hopper A at a point directly over the pivot of the same. Alongside such rod H are two flat arms I and I', one, I, being graduated in ounces and the other in the metric system. Thus by adjusting the weights G upward on rod H the leverage of the hopper is obviously increased, and by adjusting it downward the leverage is lessened correspondingly, so as to weigh larger or smaller quantities. If it be desired to have the hopper weigh and discharge alternately unequal quantities of a substance, I use the weights K, which are nuts working on a horizontal threaded rod L, arranged parallel to the side of the hopper A and directly above a graduated plate M. If the said weights K be adjusted to the left, as shown in Fig. 1, it is apparent that a larger quantity or greater weight of a substance will be required in the right-hand pocket of the hopper A in order to tilt it than is required in the left-hand pocket. Hence while one side of the hopper may receive, weigh, and discharge ten ounces of the substance the other side will weigh and discharge a much smaller quantity—say two ounces—so that large and small bottles may be filled alternately with the same ease and facility as bottles of equal size.

It will be noted that by employing two weights or nuts one will jam with the other, and thus both be locked at any desired point. When the weights G are used, the weights K must be adjusted to balance the hopper A, and when weights K are used the weights G must be adjusted down to zero on the scales I and I'.

The funnels F are each suspended by a cord N, connected with the opposite end of the hopper A. Said cord is attached to a funnel and the hopper by pivoted bails and runs over pulleys O, journaled on the ends of a horizontal bar P, fixed on a bracket Q, attached to the standard B. Thus when the hopper A tilts for discharge of a quantity of any substance the funnel on the discharge side is lowered to carry its nozzle or spout $f$ lower or into an empty bottle, while the other funnel rises, and thus draws its spout $f$ upward or nearly out of the filled bottle, so that the latter may be removed and an empty one substituted. The movements of the hopper and funnels are therefore synchronous or corresponding.

The bottles are supported on flanged tables or trays R, each having a bent arm S, that enters a socket in an arm T and is secured by a clamp-screw $s$. Said arm T is in turn secured by a screw $t$ on the standard B. Thus the tables R may be removed at will or adjusted laterally or vertically, as required to place the bottles in the exact position desired.

It will be noted that since the tubular table-supporting arms T are attached to standard B one below the other the bent arm S of one of the tables must extend higher than the other, as shown in Figs. 1 and 4, in order to bring the tables on a level.

In Fig. 4 I show an alternative adjustment of the parts for carrying the funnels up and down and holding them in vertical position when receiving and discharging a substance. In this case I dispense with the cord N, pulleys O, and bar P, before described, and substitute a collar U and pivoted links V and hinge the funnels directly to the hopper or weighing-pan. The said collar U is slidable on standard B and secured by a clamp-screw $u$. The links V are pivoted to the lower portions of the hoppers F', which are hinged at their upper edges to the ends of the hopper A'. The funnels thus rise and fall with the hopper, but are held in vertical position when a discharge takes place.

The funnel nozzles or spouts $f$ have a screw attachment, whereby they are adapted to be readily detached when it is required to substitute larger or smaller ones, according to the substance to be weighed.

In case a powder is to be weighed and put up in packages the wrapping-papers are placed on one of the tables, which in this case may be constructed plain or without a flange.

What I claim is—

1. In a weighing-machine of the class described, the combination, with a pivoted and tiltable hopper, having receiving and discharging compartments or pockets, of funnels and means for connecting them with said hopper, whereby they are carried by and are adapted to be raised and lowered with the tilting of the hopper, substantially as shown and described.

2. In a weighing-machine of the class described, the combination, with a pivoted and tiltable hopper, of funnels connected directly to said hopper, a supporting-standard, and means for connecting said funnels therewith, substantially as shown and described.

3. In a weighing-machine of the class described, the combination, with a tiltable hopper of funnels which are hinged directly to said hopper, a standard supporting the latter, a collar which is adjustable vertically on the standard, and pivoted links connecting said collar and funnels, substantially as shown and described.

4. In a weighing-machine of the class described, the combination, with a pivoted hopper of funnels which are connected therewith and carried by the hopper, and tables or trays arranged below the hopper at each end thereof, and adapted for vertical adjustment substantially as shown and described.

5. In a weighing-machine of the class described, the combination, with a tiltable hopper of funnels and means for suspending them, a vertical standard and table having lateral supports which are adjustable on said standard, substantially as shown and described.

6. In a weighing-machine of the class described, the combination, of the tiltable hopper of funnels and means for connecting them with the hopper, a vertical standard, horizontal arms which are adjustable on the latter, means for securing said arms in any adjustment, and tables carried by said arms and adapted for adjustment laterally, as shown and described.

7. In a weighing-machine of the class described, the combination, with a tiltable hopper of funnels, means for suspending them, detachable nozzles or spouts for said funnels, a standard supporting the hopper, and vertically-adjustable tables which are supported on the standard, substantially as shown and described.

8. In a weighing-machine of the class described, the combination, with a tiltable hopper of funnels, means for suspending them, a vertical standard supporting the hopper, two horizontal tubular arms which are adjustable on the standard and arranged one below the other, and tables having bent lateral arms whose vertical portions are of unequal length, as and for the purpose described.

W. BROUGH.

Witnesses:
 SOLON C. KEMON,
 AMOS W. HART.